United States Patent
Sukumaran et al.

(10) Patent No.: US 10,375,631 B2
(45) Date of Patent: *Aug. 6, 2019

(54) STATE CHANGE ENABLED BY A HIERARCHICAL CLASS OF A RADIO ACCESS NETWORK DEVICE

(71) Applicant: AT&T INTELLECTUAL PROPERTY I, L.P., Atlanta, GA (US)

(72) Inventors: Jayesh Sukumaran, Woodinville, WA (US); David Orloff, Sammamish, WA (US); Susan Reiger, Redmond, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/239,515

(22) Filed: Jan. 3, 2019

(65) Prior Publication Data

US 2019/0159125 A1 May 23, 2019

Related U.S. Application Data

(63) Continuation of application No. 15/909,972, filed on Mar. 1, 2018, now Pat. No. 10,182,397, which is a
(Continued)

(51) Int. Cl.
*H04W 36/00* (2009.01)
*H04W 52/02* (2009.01)
(Continued)

(52) U.S. Cl.
CPC ....... *H04W 52/0206* (2013.01); *H04W 16/32* (2013.01); *H04W 52/18* (2013.01);
(Continued)

(58) Field of Classification Search
CPC ..... H04W 24/02; H04W 84/18; H04W 24/04; H04W 72/10; H04W 84/042;
(Continued)

(56) References Cited

U.S. PATENT DOCUMENTS 8,423,094 B2 4/2013 Chuang et al.
8,923,874 B2 12/2014 Maeder et al.
(Continued)

FOREIGN PATENT DOCUMENTS

EP 2273827 B1 7/2013
EP 2846590 A1 3/2015
(Continued)

OTHER PUBLICATIONS

Wu et al. "Cooperative Sleep and Power Allocation for Energy Saving in Dense Small Cell Networks." IEEE Access 4 (2016): 6993-7004. Retrieved on Jan. 11, 2017, 12 pages.
(Continued)

*Primary Examiner* — Nimesh Patel
(74) *Attorney, Agent, or Firm* — Amin, Turocy & Watson, LLP

(57) ABSTRACT

Enabling a changing of a state of a device based on a hierarchical class of the device is disclosed. Non-macro radio access network (RAN) devices can be comprised in a network connected to a macro RAN device via a gateway RAN device. The gateway RAN device can be connected to a field RAN device via an intermediate RAN device. A state of a field RAN device can be altered based on a criterion. In an embodiment the criterion can be use of the hierarchical class of the RAN device, e.g., a field class RAN device, by an active or idle UE. In an embodiment the criterion can be use, by an active or idle UE, of another RAN device that is a logical neighbor to the field RAN device. Altering the state
(Continued)

can result in a power savings or improved interference characteristics of the network.

20 Claims, 10 Drawing Sheets

Related U.S. Application Data continuation of application No. 15/462,775, filed on Mar. 17, 2017, now Pat. No. 9,930,617.

(51) Int. Cl.
*H04W 16/32* (2009.01)
*H04W 52/18* (2009.01)

(52) U.S. Cl.
CPC .............. *Y02D 70/00* (2018.01); *Y02D 70/10* (2018.01); *Y02D 70/1224* (2018.01); *Y02D 70/1226* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/14* (2018.01); *Y02D 70/142* (2018.01); *Y02D 70/144* (2018.01); *Y02D 70/146* (2018.01); *Y02D 70/168* (2018.01); *Y02D 70/26* (2018.01)

(58) Field of Classification Search
CPC . H04W 72/0413; H04W 84/10; H04W 88/06; H04W 88/18; H04W 28/08; H04W 36/22; H04W 40/02; H04W 40/12; H04W 84/22; H04W 88/16; H04W 8/26; H04W 8/02; H04W 76/02; H04W 84/045; H04W 88/08; H04W 92/12; H04W 36/14; H04W 40/00; H04W 24/10; H04W 28/0236; H04W 28/06; H04W 40/22; G06F 1/3287; G06F 1/3203; G06F 1/3206; G06F 1/3215; G06F 9/4843; G06F 11/3466; G06F 1/3209; G06F 1/3234; G06F 1/3237; G06F 1/3275; H04M 1/04; H04M 1/57; H04M 1/6041; H04M 1/72547; H04M 1/72552
See application file for complete search history.

(56) References Cited

U.S. PATENT DOCUMENTS

| | | |
|---|---|---|
| 9,088,949 B2 | 7/2015 | Van Oost et al. |
| 9,185,647 B2 | 11/2015 | Hosobe et al. |
| 9,232,479 B2 | 1/2016 | Hui et al. |
| 9,264,993 B2* | 2/2016 | Park .................. H04W 52/0216 |
| 9,930,617 B1* | 3/2018 | Sukumaran ....... H04W 52/0206 |
| 10,182,397 B2* | 1/2019 | Sukumaran ....... H04W 52/0206 |
| 2011/0237239 A1 | 9/2011 | Chou et al. |
| 2013/0028157 A1* | 1/2013 | Ruster ............... H04W 52/0206 370/311 |
| 2013/0295932 A1* | 11/2013 | Hosobe ............. H04W 52/0274 455/435.1 |
| 2016/0262063 A1 | 9/2016 | Chen et al. |
| 2016/0335111 A1* | 11/2016 | Bruun ................ G06F 9/45558 |

FOREIGN PATENT DOCUMENTS

| | | |
|---|---|---|
| WO | 2012017651 A1 | 2/2012 |
| WO | 2014056174 A1 | 4/2014 |
| WO | 2014153709 A1 | 10/2014 |
| WO | 2015020033 A1 | 2/2015 |

OTHER PUBLICATIONS

Notice of Allowance for U.S. Appl. No. 15/462,775, dated Nov. 13, 2017, 41 pages.

Office Action dated Apr. 17, 2018 for U.S. Appl. No. 15/909,972, 25 pages.

* cited by examiner

STATE CHANGE ENABLED BY A HIERARCHICAL CLASS OF A RADIO ACCESS NETWORK DEVICE

RELATED APPLICATION

The subject application is a continuation of, and claims priority to, U.S. patent application Ser. No. 15/909,972, filed 1 Mar. 2018, and entitled "STATE CHANGE ENABLED BY A HIERARCHICAL CLASS OF A RADIO ACCESS NETWORK DEVICE," which is a continuation of U.S. patent application Ser. No. 15/462,775, filed 17 Mar. 2017, and entitled "STATE CHANGE ENABLED BY A HIERARCHICAL CLASS OF A RADIO ACCESS NETWORK DEVICE," now issued as U.S. Pat. No. 9,930,617, the entireties of which application(s) are hereby incorporated by reference herein.

TECHNICAL FIELD

The disclosed subject matter relates to enabling a changing of a state of a device based on a hierarchical class of the device, e.g., enabling changing to, or from, a lower power state for a radio access network (RAN) device based on a hierarchical class of the RAN device, for example wherein the device is a femtocell, picocell, other small cell, access point (AP), etc.

BACKGROUND

A conventional heterogeneous radio access network (RAN) environment can encompasses conventional macro cells, small cells, e.g., femtocells, picocells, etc., and Wi-Fi access points. These conventional heterogeneous RAN environments are becoming increasingly common to provide mobile or wireless devices access to a network over a wireless link. Small cells can be a common part of 4G networks and can be expected to similarly be common in the evolution of 5G networks. Some estimates propose that heterogeneous networks may be composed of 85% small cells and 15% macro cells by as early as 2020. Moreover, operation in the unlicensed spectral regions/bands is also becoming increasingly common in conventional heterogeneous networks. This can suggest that, increasingly, heterogeneous network architectures, possibly operating in the unlicensed band, can place a high value on interference management. Similarly, energy conservation and management can become increasingly important as more and more small devices are deployed in in these heterogeneous networks. As such, businesses can be expected to strive for efficient and be a responsible operation of network devices, e.g., RAN devices, small cells, access points, etc.

DETAILED DESCRIPTION

Figure 1:
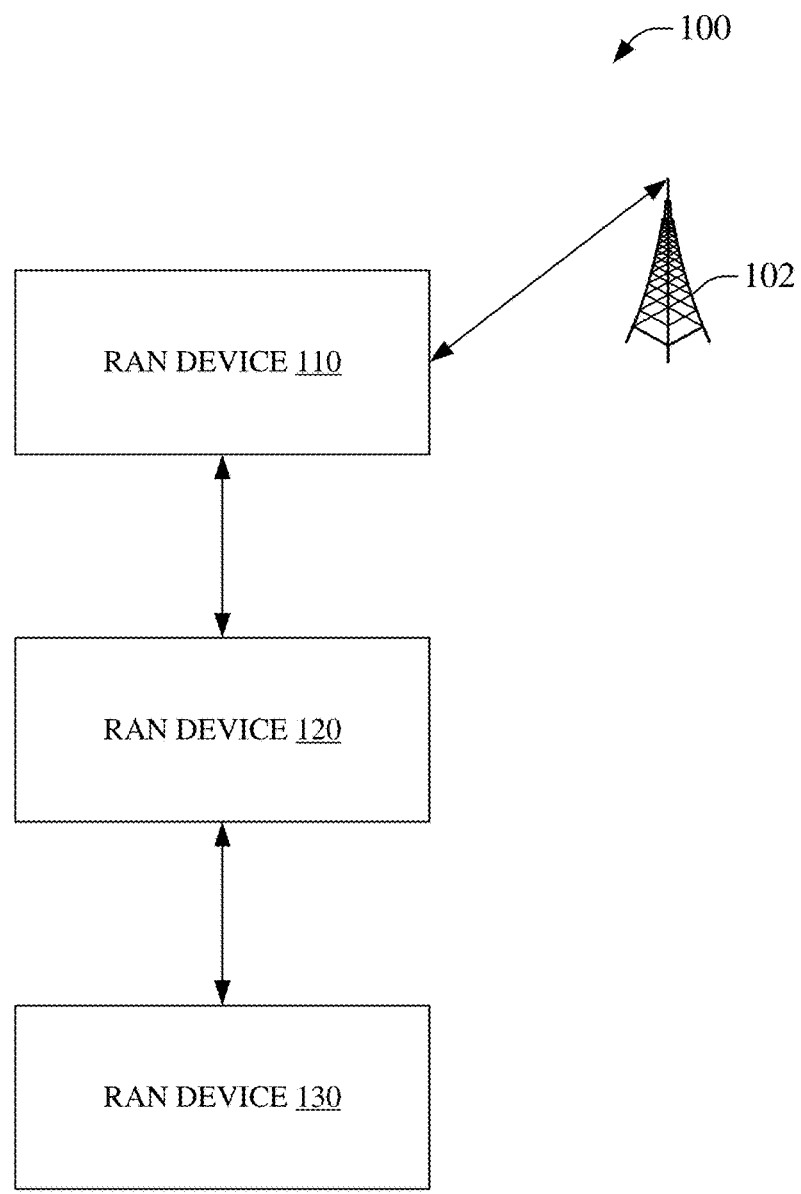
FIG. 1 is an illustration of an example system that can enable changing a device state based on a hierarchical class of the device, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Modern radio access network (RANs) can comprise heterogeneous types of RAN equipment in the RAN environment. These heterogeneous RAN devices can encompasses conventional macro cells, small cells, e.g., femtocells, picocells, etc., Wi-Fi access points (Wi-Fi APs), millimeter-wave devices, etc. Conventional heterogeneous RAN environments are becoming increasingly common to provide mobile or wireless devices access to a network over a wireless link. Small cells can be a common part of 4G networks and can be expected to similarly be common in the evolution of 5G networks. Moreover, operation in the unlicensed spectral regions/bands is also becoming increasingly common in conventional heterogeneous networks. It can therefore be expected that efficient power and efficient spectral operation of network devices is desirable. Generally, in the context of this disclosure, the term 'RAN device(s)', or similar terms, can refer to non-macro cell devices, e.g., small cells, Wi-Fi APs, other APs, etc., such as those associated with providing enterprise level service(s), etc., and accordingly macro cell RAN devices will typically be referred to as 'macro cell(s),' 'macro RAN device(s)', or similar terms to distinguish them from non-macro cell RAN devices.

Conventional RAN devices, e.g., deployed in enterprise environments, etc., can remain powered on and transmit wireless signals continuously, 24 hours a day, even if there are no users in the building (e.g., after hours, holidays and on weekends). This can needlessly waste resources and can generate spectrum interference, e.g., interfering with nearby RAN devices and/or nearby macro RAN devices, because walls can fail to attenuate interfering radio frequency (RF) signals sufficiently. As such, there can be noteworthy leakage of RF signals from buildings that can interfere with other RAN and/or macro RAN devices. Devices that generate interfering RF signals can be termed 'interferes'. Moreover, these same interferers can also consume power even where they are not needed to support current UE traffic.

A modern building can have multiple floors and each floor can have multiple RAN devices to provide wireless coverage, e.g., wireless coverage to indoor spaces, nearby outdoor spaces affiliated with the building, etc., hereinafter termed 'indoor space(s)' or similar terms, for clarity and brevity. Mobile device users enjoy seamless wireless service transitions between outdoor spaces and indoor spaces and to enable mobility from an outdoor space, associated with a macro RAN device, to an indoor space, associated with a RAN device network, certain RAN devices in a building can be designated as "gateway" RAN device(s). A gateway RAN device can be designated as a RAN device located near an entrance point of a building. The gateway RAN device can therefore be viewed as a RAN device that can have a neighbor relation to a macro RAN device to facilitate transitioning a mobile device from the macro service to the RAN service of the building. Moreover, other RAN devices of the building that are not designated as gateway RAN devices can be termed field RAN devices. Field RAN devices generally will not have a neighbor relation to a macro RAN device. Field RAN devices can, however, have a neighbor relationship with other RAN devices, e.g., a gateway RAN device, another field RAN device, etc. These neighbor relationships between RAN devices can be created, maintained, destroyed, modified, etc., manually and/or autonomously, based on various methods devised to neighbor relationships, e.g., self-organizing behavior, self-optimizing behavior, etc.

In an aspect, determining a hierarchical class of a RAN device can enable adaptation of a state of the device. In an embodiment, RAN devices can be classed as gateway RAN devices, field RAN devices, and intermediate RAN devices. A gateway RAN device can be affiliated with an entry point to a network, e.g., an entry to a building, an entry to a park, an entry to a mine, etc. A gateway RAN device can typically have a neighbor relation to a macro RAN device to enable transition of a user equipment from a macro network to a network attached to the macro network via the gateway RAN device. An intermediate RAN device can have a neighbor relationship with a gateway RAN device and a field RAN device. A field RAN device can have neighbor relations with other field RAN device(s) or an intermediate RAN device, but will not have a neighbor relation with a gateway RAN device or a macro RAN device, e.g., a field device that has a neighbor relation with a gateway RAN device is typically an intermediate RAN device, a field device that has a neighbor relation to a macro RAN device is typically a gateway RAN device. It will be noted that a gateway RAN device, an intermediate RAN device, and/or a field RAN device can be identical devices that have different neighbor relations, can be different devices, e.g., different types of device, differently configured same devices, etc., that have different neighbor relations. In an aspect, a gateway RAN device can be a first hierarchical class, an intermediate RAN device can be a second hierarchical class, and a field RAN device can be a third hierarchical class, wherein the classes differ based on neighbor relationships and corresponding differences in functionality, rather than explicitly by the type or configuration of a device. As an example, a first RAN device can be a field RAN device that can be moved to a building entry point and can be designated as a gateway RAN device allowing the first device to have a neighbor relationship with a macro RAN device. As a second example, a gateway RAN device can be re-designated as a field RAN device allowing only neighbor relationships with other field RAN devices and intermediate RAN devices.

The use of hierarchical RAN device classes can enable state transitions of RAN devices. These state transitions can in some embodiments reduce the likelihood that a RAN device is an interferer, e.g., the RAN device can be an interferer less often, etc. These state transitions can in some embodiments reduce the power consumed by RAN devices. As an example, a state transition can be from a full power state, e.g., receive/transmit at full strength, etc., to a sleep state, e.g., reduced transmission of RF signals, etc., to an off state, e.g., the RAN device powers off and draws no power. In this example, power consumption is reduced and the RAN device can be less of an interferer.

In an aspect, state transitions can be controlled by the RAN device itself, can be controlled by a local controller communicatively coupled to the RAN device, can be centrally controlled by a remotely located controller via a macro communication network, etc. As an example, each small cell or AP can report its traffic load to a smart controller. The example smart controller can be a logical entity and could be a localized in building, could be centralized in a network operator's location, virtualized in a cloud-based environment, etc. In some embodiments, control can be integrated as one of the functions in an existing system, e.g., a self-organizing network (SON) controller, within a RAN device itself, etc. A controller, based on a parameter, such as the hierarchical class of the RAN device, use of a RAN device and/or a coupled RAN device, supplementary data, e.g., date (weekday, weekend, national or company holiday), time (regular working hours, after hours), historical use data, etc., rules, received indicia, etc., can determine if a state transition is allowed, can determine to initiate a state transition, can adapt a RAN device state, etc. As an example, a virtualized controller can activate a 'power saving' mode on a RAN device, via a signal sent to the RAN device over a communication framework, based on the RAN device being a field RAN device and all neighboring RAN devices indicating that they are without a camped or in use UE. In some embodiments, a controller can 'learn' or form inferences based on historical usage, e.g., usage patterns of a RAN device at a particular location, etc., and can use learned behavior(s), inference(s), etc., as an input to a decision making process regarding the state transition. As an example, a field RAN device can learn that it is typically used between 6 am and 6 pm, Monday to Friday, and can accordingly not check for possibilities of a state transition during those hours. In an aspect, over a period of time, more especially in a large location with potentially tens to thousands of RAN devices, the disclosed subject matter can result in notable energy savings and, in some embodiments, can concurrently provide a less cluttered spectrum.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate changing a device state based on a hierarchical class of the device, in accordance with aspects of the subject disclosure. System 100 can comprise macro RAN device 102. Macro RAN device 102 can be an access point to a macro network, e.g., a macro cellular device, a NodeB, an eNodeB, a wide area network (WAN) AP, etc. In some embodiments, macro RAN device 102 can be connected to a communications network associated with a wireless network provider identity. Typically, a user equipment (UE) can communicate via a wireless interface to macro RAN device 102. The UE can be transferred from macro RAN device 102 to another macro RAN device as the UE moves between a location served by macro RAN device 102 and a location served by the other macro RAN device, e.g., a cellular handover, etc. In an aspect, macro RAN device 102 can be a neighbor of a gateway RAN device, e.g., RAN device 110.

System 100 can comprise RAN device 110. Ran device 110 can be a gateway RAN device. A gateway RAN device, e.g., RAN device 110, can have a neighbor relationship with macro RAN device 102. Accordingly, a UE can transition, e.g., be handed over, between RAN device 110 and macro RAN device 102. As an example, where a UE is transported into an office building, over the air communication to macro RAN device 102 can degrade due to RF attenuation associated with the building, etc. The example UE can seek to transition to another RAN access device to maintain UE services. Accordingly, where the example building comprises RAN device 110, the UE can be handed from macro RAN device 102 to RAN device 110 based on the neighbor relationship between macro RAN device 102 and RAN device 110. In contrast, for example where a neighbor relationship does not exist between macro RAN device 102 and RAN device 110, the UE can be dropped from macro RAN device 102 before acquiring service via RAN device 110, which can result in an interruption of UE services. Where RAN device 110 is a gateway RAN device, in some embodiments, RAN device 110 can be have a neighbor relationship with RAN device 120.

RAN device 120, of system 100, can be an intermediate RAN device. In an aspect, an intermediate RAN device can have a neighbor relation with a field RAN device, another intermediate RAN device, and/or a gateway RAN device. In an aspect, an intermediate RAN device, e.g., RAN device 120, can be interposed between a field RAN device and a gateway RAN device, wherein the gateway RAN device can be interposed between macro RAN device 102 and the intermediate RAN device. In some embodiments, intermediate RAN device, e.g., RAN device 102, etc., can be a first layer of RAN devices that can support a transition to/from a gateway RAN device.

System 100 can further comprise RAN device 130 that can have a neighbor relationship with RAN device 120. RAN device 130 can be a field RAN device. In an aspect, a field RAN device, e.g., RAN device 120, etc., can have a neighbor relationship with other field RAN devices and/or an intermediate RAN device, e.g., RAN device 120. As such, in some embodiments, a field RAN device, e.g., RAN device 120, etc., can be at least one hierarchical layer away from a gateway RAN device, e.g., RAN device 110, etc.

In an aspect, a RAN device can be enabled to undergo a state transition based on satisfying a hierarchical class rule. The hierarchical class rule can, for example, reserve state transitions for field RAN device(s) only, e.g., an intermediate RAN device and/or a gateway RAN device can be deemed ineligible to undergo a state transition. Moreover, eligibility to undergo a state transition can be distinct from determining if a state transition is to be initiated or performed. As an example, a field RAN device, e.g., RAN device 130, etc., can be determined to be eligible for a state transition but may, or may not, undergo a state transition based on a further criterion, e.g., the field RAN device is not in use by a UE, etc.

In an embodiment, where RAN device 130 is eligible to undergo a state transition, a state transition of RAN device 130 can be initiated in response to determining that a self-use rule related to use of RAN 130 has been satisfied and that a neighbor-use rule related to use of RAN 120 has been satisfied. In an aspect, the neighbor use rule is related to use of a neighbor RAN device to RAN device 130 rather than to use of an intermediate RAN device, e.g., RAN device, etc., specifically. As an example, where RAN device 130 has a neighbor relationship to another field RAN device, rather than to an intermediate RAN device like 120, and the other field RAN device is in use by a UE, then a state transition may not be initiated based on a possibility of the UE transitioning from the neighboring field RAN device to RAN device 130. Use of a RAN device can include active and idle use, e.g., active use can be based on a radio access bearer resource being established for the UE via the RAN device while idle use can lack the radio access bearer resource but still have the UE logically camped on the RAN device.

Figure 2:
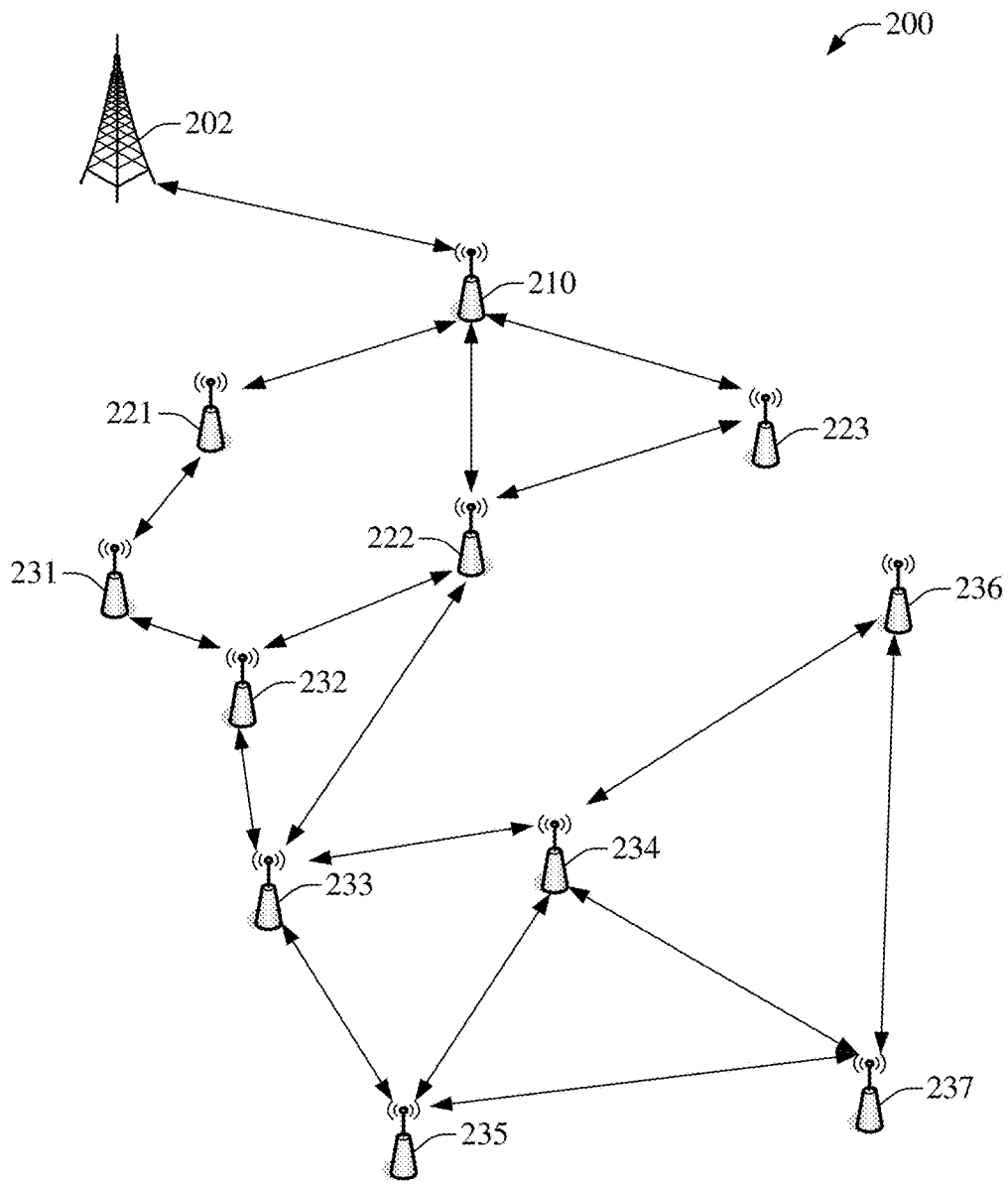
FIG. 2 is an illustration of an example system that can facilitate changing a device state based on a hierarchical class of the device among a plurality of devices comprising the device, in accordance with aspects of the subject disclosure.

FIG. 2 is an illustration of a system 200, which can facilitate changing a device state based on a hierarchical class of the device among a plurality of devices comprising the device, in accordance with aspects of the subject disclosure. System 200 can comprise macro RAN device 202. Macro RAN device 202 can be an access point to a macro network. In some embodiments, macro RAN device 202 can be connected to a communications network associated with a wireless network provider identity. Typically, a UE can communicate via a wireless interface to macro RAN device 202. The UE can be transferred from macro RAN device 202 to another macro RAN device as the UE moves between a location served by macro RAN device 202 and a location served by the other macro RAN device.

System 200 can comprise RAN device 210. Ran device 210 can be a gateway RAN device. A gateway RAN device, e.g., RAN device 210, can have a neighbor relationship with macro RAN device 202. Accordingly, a UE can transition between RAN device 210 and macro RAN device 202. In some embodiments, RAN device 210 can further have a neighbor relationship with RAN device(s) 221-223, etc.

RAN device(s) 221-223, of system 200, can be intermediate RAN device(s). In an aspect, an intermediate RAN device can have a neighbor relation with a field RAN device, another intermediate RAN device, and/or a gateway RAN device, as illustrated. As an example, RAN device 221 can have a neighbor relationship with gateway RAN device 210 and field RAN device 231. As another example, RAN device 222 can have a neighbor relationship with gateway RAN device 210 and field RAN devices 232 and 233, as well as to another intermediate RAN device, e.g., RAN device 223. As a further example, RAN device 223 can have a neighbor relationship with gateway RAN device 210 and intermediate RAN device 222. Of note, intermediate RAN device(s) 221-223 do not have a neighbor relationship with macro RAN device 202, e.g., in some embodiments, only a gateway RAN device, e.g., 210, can have a neighbor relationship with a macro RAN device, e.g., 202. In an aspect, an intermediate RAN device, 221-223, can be interposed between a field RAN device, e.g., 231-237, and a gateway RAN device, e.g., 210. Moreover, a gateway RAN device, e.g., 210, can be interposed between macro RAN device 202 and intermediate RAN device(s), e.g., 221-223. In some embodiments, intermediate RAN devices can be a first layer of RAN devices that can support a transition between a gateway RAN device and a field RAN device.

System 200 can further comprise field RAN device(s) 231-237 that can have a neighbor relationship with intermediate RAN device(s) 221-223, as illustrated. A field RAN device, 231-237, can have a neighbor relationship with other field RAN devices 231-237, and/or intermediate RAN device(s), 221-223. As an example, field RAN device 231 can have a neighbor relationship with intermediate RAN device 221 and field RAN device 232. As another example, field RAN device 234 can have a neighbor relationship with field RAN device 233, field RAN device 236, field RAN device 237, field RAN device 235, and field RAN device 233, but not have one with an intermediate RAN device, 221-223, nor with a gateway RAN device 210, nor macro RAN device 202. As such, in some embodiments, a field RAN device, 231-237, can be at least one hierarchical layer away from a gateway RAN device, 210, e.g., separated by at least intermediate RAN device 221-223.

In an aspect, a RAN device can be enabled to undergo a state transition based on satisfying a hierarchical class rule. The hierarchical class rule can, for example, reserve state transitions for field RAN device(s) 231-237 only, e.g., an intermediate RAN device 221-223, and/or a gateway RAN device 210 can be deemed ineligible to undergo a state transition. Moreover, eligibility to undergo a state transition can be distinct from determining if a state transition is to be initiated or performed. In an embodiment, where a field RAN device, 231-237, is eligible to undergo a state transition, the state transition of the field RAN device, 231-237, can be initiated in response to determining that a self-use rule related to UE use of field RAN device, 231-237, has been satisfied and that a neighbor-use rule related to UE use of a neighboring RAN device, e.g., field RAN device, 231-237, and/or intermediate RAN device 221-223, has been satisfied. In an aspect, the neighbor use rule is related to use of a neighbor RAN device to RAN device 230 rather than to use of an intermediate RAN device, e.g., RAN device, etc., specifically. As a first example, where RAN device 231 has a neighbor relationship to field RAN device 232 and to intermediate RAN device 221, then UE use of field RAN device 231 or 232, or UE use of field RAN device 221, can restrict implementation of a state transition for filed RAN device 231 even where field RAN device 231 is eligible for a state transition. As a second example, where RAN device 235 has a neighbor relationship to field RAN devices 233, 234, and 237, then UE use of field RAN device 233, 234, 235, or 237, can restrict implementation of a state transition for field RAN device 235 even where field RAN device 235 is eligible to otherwise undergo a state transition.

Figure 3:
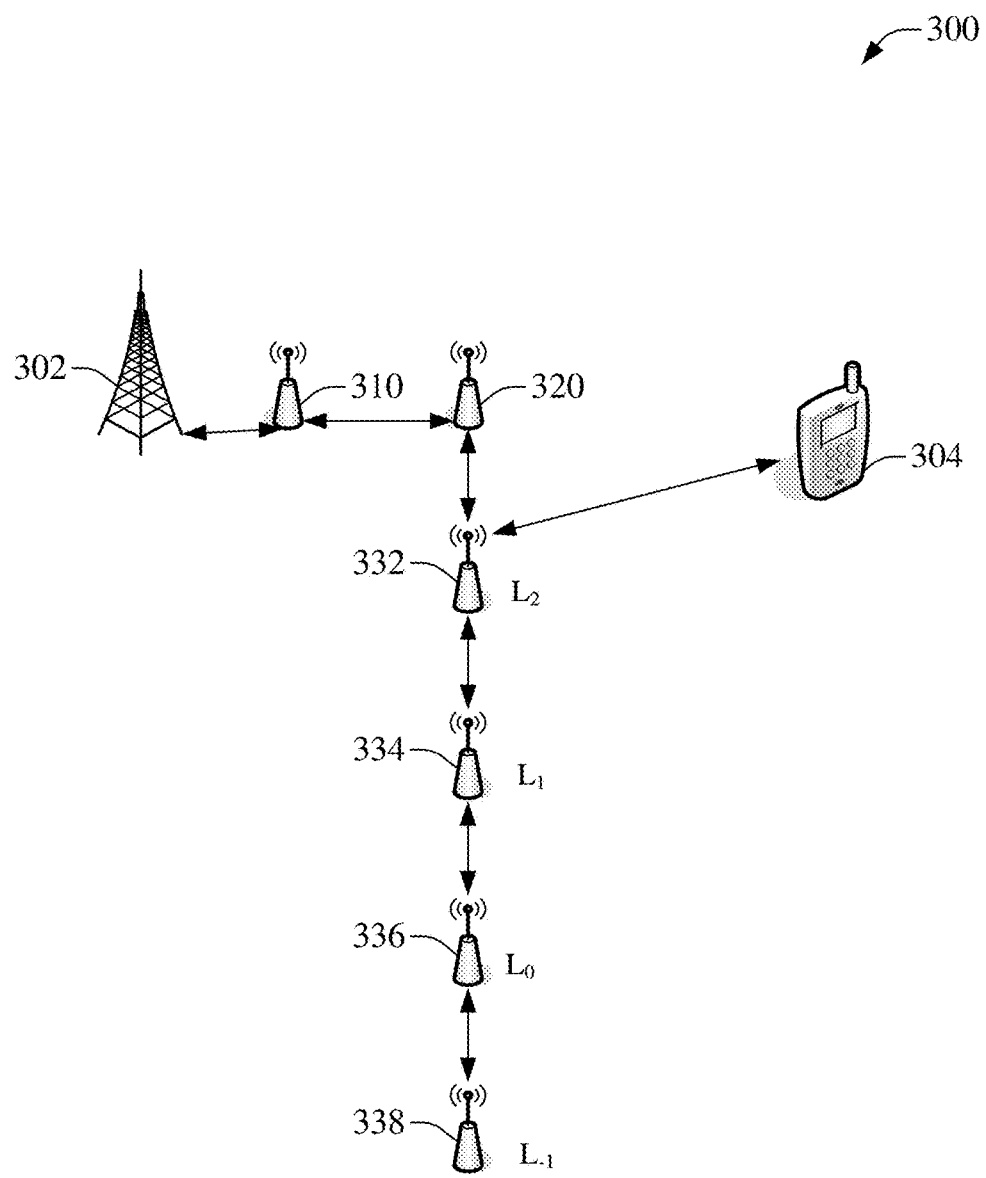
FIG. 3 is an illustration of an example system that can facilitate changing a device state based on a hierarchical class of the device and use of another device in a network comprising the device and the other device, in accordance with aspects of the subject disclosure.

FIG. 3 is an illustration of a system 300, which can facilitate changing a device state based on a hierarchical class of the device and use of another device in a network comprising the device and the other device, in accordance with aspects of the subject disclosure. System 300 can comprise macro RAN device 302. Macro RAN device 302 can be an access point to a macro network. In some embodiments, macro RAN device 302 can be connected to a communications network associated with a wireless network provider identity. Typically, a UE can communicate via a wireless interface to macro RAN device 302. The UE can be transferred from macro RAN device 302 to another macro RAN device as the UE moves between a location served by macro RAN device 302 and a location served by the other macro RAN device.

System 300 can comprise gateway RAN device 310. Gateway RAN device can have a neighbor relationship with macro RAN device 302. Accordingly, a UE can transition between gateway RAN device 310 and macro RAN device 302. In some embodiments, gateway RAN device 310 can further have a neighbor relationship with intermediate RAN device 320.

Intermediate RAN device 320, of system 300, can have a neighbor relation with a field RAN device, e.g., 332-338, another intermediate RAN device, not illustrated, and/or a gateway RAN device, e.g., 310, as illustrated. As an example, intermediate RAN device 320 can have a neighbor relationship with gateway RAN device 310 and field RAN device 332. Of note, intermediate RAN device 320 does not have a neighbor relationship with macro RAN device 302, e.g., in some embodiments, only gateway RAN device 310 can have a neighbor relationship with macro RAN device 302. In an aspect, an intermediate RAN device 320 can be interposed between a field RAN device, e.g., 332-338, and gateway RAN device 310. Moreover, gateway RAN device 310 can be interposed between macro RAN device 302 and intermediate RAN device 320. In some embodiments, intermediate RAN devices can be a first layer of RAN devices that can support a UE transition between a gateway RAN device and a field RAN device via the intermediate RAN device.

System 300 can further comprise field RAN device(s) 332-338 that can have a neighbor relationship with intermediate RAN device 320, or with other field RAN devices 332-338, as illustrated. As an example, field RAN device 332 can have a neighbor relationship with intermediate RAN device 320 and field RAN device 334. As another example, field RAN device 334 can have a neighbor relationship with field RAN device 332, field RAN device 336, but not have a neighbor relationship with an intermediate RAN device, 320, with a gateway RAN device, 310, nor with a macro RAN device, 302. As such, in some embodiments, a field RAN device, 332-338, can be at least one hierarchical layer away from gateway RAN device 310, e.g., separated by at least intermediate RAN device 320.

In an aspect, a RAN device can be enabled to undergo a state transition based on satisfying a hierarchical class rule. The hierarchical class rule can, for example, reserve state transitions for field RAN device(s) 332-338 only, e.g., intermediate RAN device 320, and/or a gateway RAN device 310 can be deemed ineligible to undergo a state transition. Moreover, eligibility to undergo a state transition can be distinct from determining if a state transition is to be initiated or performed. In an embodiment, where field RAN device, 332-338, are eligible to undergo a state transition, the state transition of the field RAN device, 332-338, can be initiated in response to determining that a self-use rule related to UE use of field RAN device, 332-338, has been satisfied and that a neighbor-use rule related to UE use of a neighboring RAN device, e.g., field RAN device, 332-338, and/or intermediate RAN device 320, has been satisfied. As a first example, RAN device 332 can have a neighbor relationship to field RAN device 334 and to intermediate RAN device 320, such that UE use of field RAN device 332, 334, or UE use of field RAN device 320, can cause either the self-use or neighbor-use rule to not be satisfied, thwarting implementation of a state transition for field RAN device 331. System 300 illustrates this by showing UE 304 using field RAN device 332, which can cause the self-use rule to be unsatisfied and can result in no state transition being initiated. As a second example, where RAN device 336 has a neighbor relationship to field RAN devices 334 and 338, and UE 304 uses field RAN device 332 rather than 334 or 338, then both the self-use and neighbor-use rule can be satisfied. It will be noted that in some embodiments, the neighbor-use rule can be adapted to reflect more than a first layer of neighbor RAN device. In these embodiments, UE 304 use of 332 can affect satisfaction of the neighbor-use rule, for example for field RAN device 336, 338, etc. In some embodiments, the neighbor-use rule can be based on the density of RAN devices, e.g., where the devices are dense, it can be more likely that a transition between a used and unused RAN device can occur rapidly enough in time that it can be desirable to avoid state transitions for a plurality of layers between an in use RAN device and an eligible RAN device.

Figure 4:
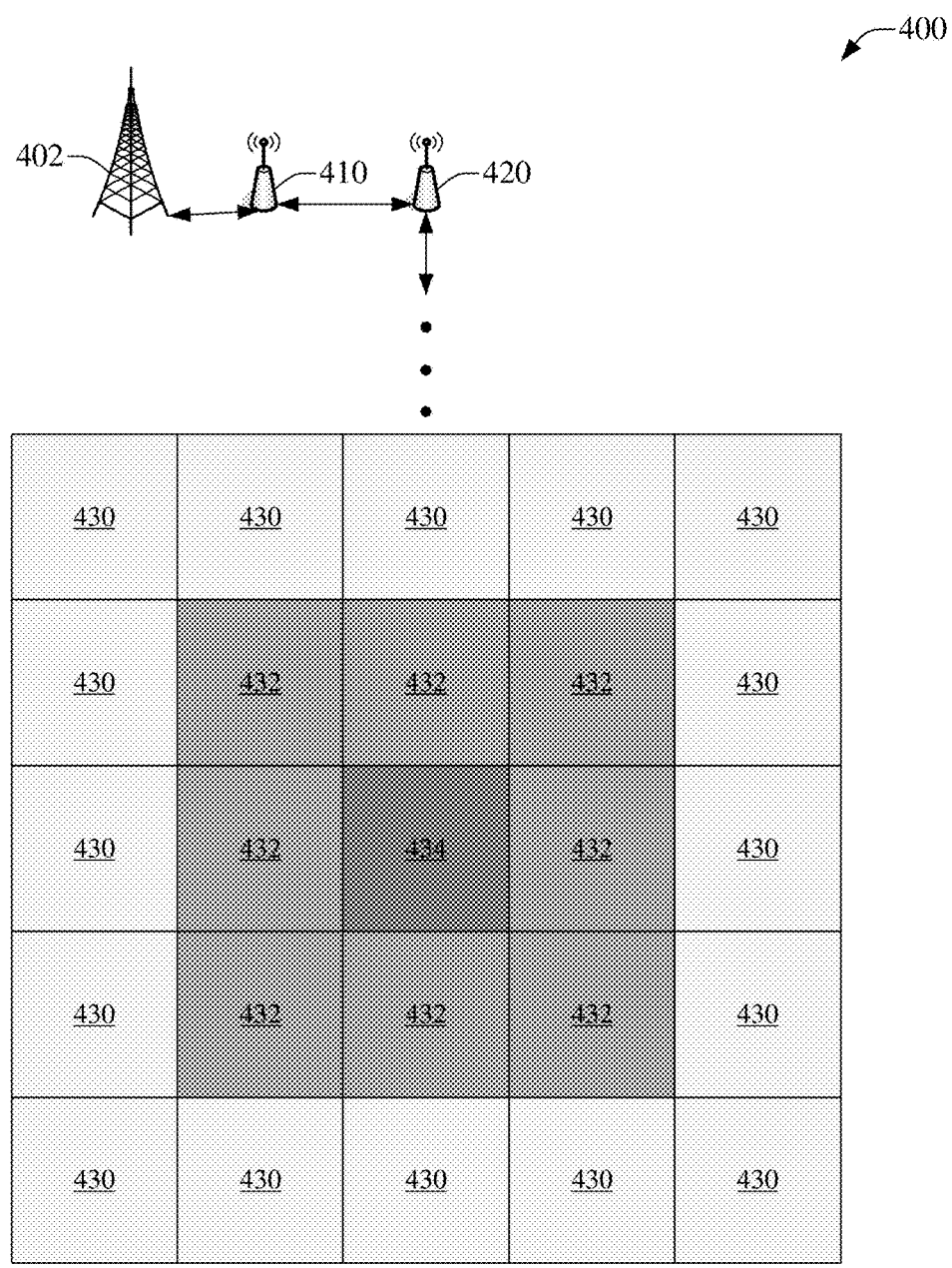
FIG. 4 is an illustrates an example system that can facilitate changing a device state based on a hierarchical class of the device and neighboring device(s) state(s), in accordance with aspects of the subject disclosure.

FIG. 4 is an illustration of a system 400, which can facilitate changing a device state based on a hierarchical class of the device and neighboring device(s) state(s), in accordance with aspects of the subject disclosure. System 400 can comprise macro RAN device 402. Macro RAN device 402 can be an access point to a macro network. In some embodiments, macro RAN device 402 can be connected to a communications network associated with a wireless network provider identity. Typically, a UE can communicate via a wireless interface to macro RAN device 402. The UE can be transferred from macro RAN device 402 to another macro RAN device as the UE moves between a location served by macro RAN device 402 and a location served by the other macro RAN device.

System 400 can comprise gateway RAN device 410. Gateway RAN device can have a neighbor relationship with macro RAN device 402. Accordingly, a UE can transition between gateway RAN device 410 and macro RAN device 402. In some embodiments, gateway RAN device 410 can further have a neighbor relationship with intermediate RAN device 420. Intermediate RAN device 420, of system 400, can have a neighbor relation with a field RAN device(s), e.g., 430, 432, 434, etc. another intermediate RAN device, not illustrated, and/or a gateway RAN device, e.g., 410, as illustrated.

System 400 can further comprise field RAN device(s) 430, 432, 434, etc., that can have a neighbor relationship with other field RAN devices 430, 432, 434, etc., as illustrated. In an embodiment, field RAN device 434 can have neighbor relations with a first layer of other field RAN devices as indicated by the medium grey band of field RAN devices 432, surrounding field RAN device 434. Field RAN device 434 can have extended neighbor relations with a second layer of other field RAN devices, e.g., the neighbors of the first layer can be extended neighbors of 434, as indicated by the light grey band of field RAN devices 430, surrounding the first layer of field RAN 432. As such, in some embodiments, field RAN device 434 can be at least one hierarchical layer away from gateway RAN device 410, e.g., separated by at least intermediate RAN device 420, and generally one or more layers of filed RAN devices, e.g., 430, 432, 434, etc.

In an aspect, a RAN device can be enabled to undergo a state transition based on satisfying a hierarchical class rule. The hierarchical class rule can, for example, reserve state transitions for field RAN device(s) 430-434 only, e.g., intermediate RAN device 420, and/or a gateway RAN device 410 can be deemed ineligible to undergo a state transition. Moreover, eligibility to undergo a state transition can be distinct from determining if a state transition is to be initiated or performed. In an embodiment, where field RAN device 434 is eligible to undergo a state transition, the state transition of the field RAN device 434 can be initiated in response to determining that a self-use rule related to UE use of field RAN device 434 has been satisfied and that a neighbor-use rule related to UE use of a neighboring RAN device, e.g., field RAN device, 432 has been satisfied. As such, UE use of any of the field RAN devices 432 can prevent initiation of a state transition for the field RAN device 434, for example, because there is a possibility of a UE transitioning from a neighboring field RAN device 432 to field RAN device 434. This can be understood more clearly where the state transition is putting field RAN device 434 into a low-power state, in that if a UE attached to field RAN device 432 attempts to transition to field RAN device 434, the time it takes to bring field RAN device 434 out of a low-power state can cause transition problems and, as such, a direct neighbor that has a UE attached can be used to prevent an eligible RAN device from undergoing a state transition. In some embodiments, the neighbor-user rule can extend beyond the first layer of neighbor RAN device, e.g., field RAN devices 432 are the first layer to field RAN device 434. In these embodiments, use of a second, third, etc., layer RAN device can affect the implementation of a state transition for an eligible RAN device. As an example, the UE use of the second layer field RAN devices 430 to field RAN device 434 can prevent a state transition for field RAN device 434.

Figure 5:
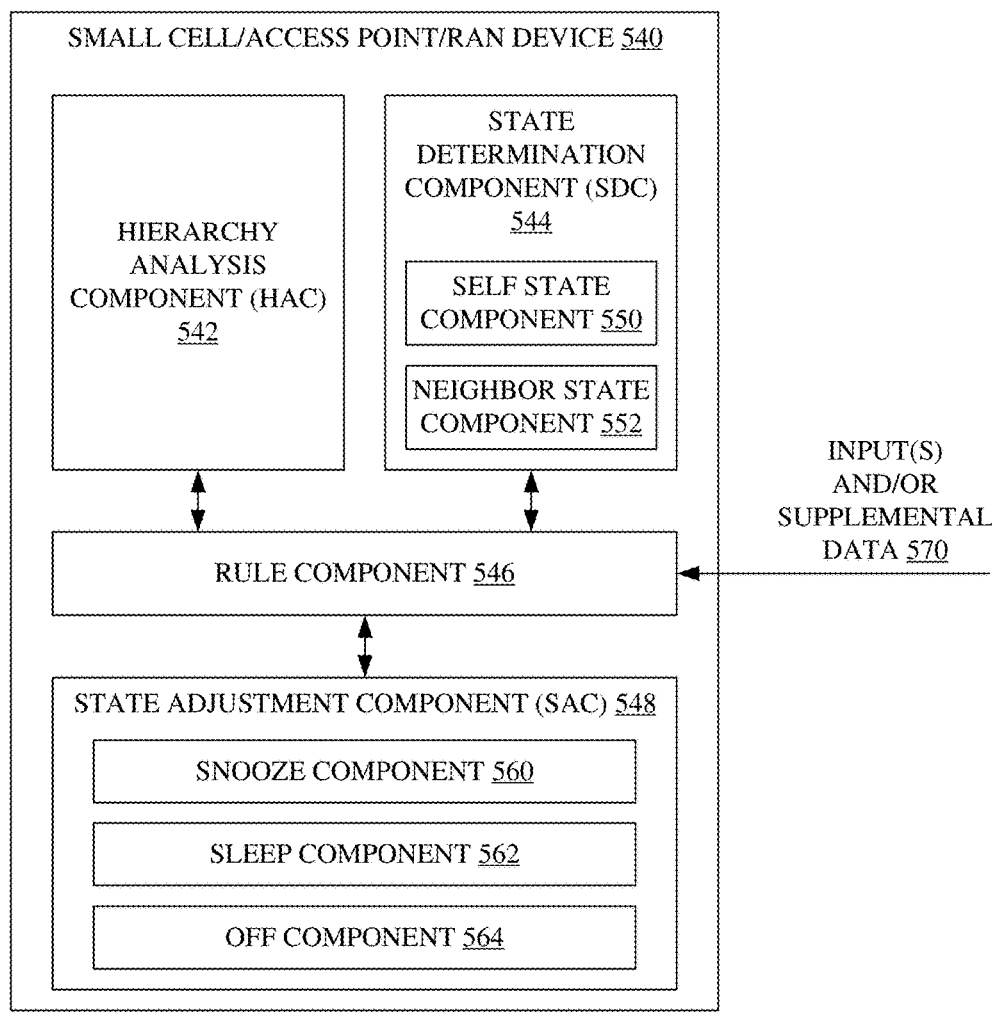
FIG. 5 is an illustration of an example system that can facilitate changing a device state based on a hierarchical class of the device and received data, in accordance with aspects of the subject disclosure.

FIG. 5 is an illustration of a system 500, which can facilitate changing a device state, based on a hierarchical class of the device and received data, in accordance with aspects of the subject disclosure. System 500 can comprise small cell/AP/RAN device 540, hereinafter RAN device 540. RAN device 540 can be the same as or similar to RAN device(s) 110, 120, 130, 210, 221-223, 231-237, 310, 320, 332-338, 410, 420, 430, 432, 434, etc. RAN device 540 can comprise hierarchy analysis component (HAC) 542. HAC 542 can determine a hierarchical class of a RAN device, e.g., 540, etc. In an embodiment, the hierarchical class can be a gateway RAN device, an intermediate RAN device, a field RAN device, etc., as disclosed herein. In an aspect, additional hierarchical classes can be employed, e.g., a first layer of neighbor RAN device, a second layer of RAN devices, etc. In an aspect, HAC 542 can determine a hierarchical level of RAN 540, of other RAN devices, e.g., first layer neighbors, second layer neighbors, etc. In an embodiment, HAC 542 can determine a hieratical map of RAN devices in a device network, a portion of a device network, etc. The device map and/or hierarchical class information determined by HAC 542 can be employed in determining eligibility for a state transition of a RAN device. Moreover, the device map and/or hierarchical class information determined by HAC 542 can be employed in self-use and neighbor-use rule analysis.

RAN device 540 can further comprise state determination component (SDC) 544. SDC 544 can determine the current or historical state of RAN 540, via self-state component 550, or of another RAN device, via neighbor-state component 552. A state diagram or model thereof can then be used to determine possible state transitions from the current state determined by SDC 544. In an aspect, a current state can comprise information indicative of UE use of a RAN device. As an example, SDC 544 can determine, via self-state component 550, if RAN device 540 is in use by a UE, e.g., a UE is camped on RAN device 540, is actively using RAN device 540, etc. As another example, SDC 544 can determine, via neighbor-state component 552, if another RAN device, e.g., a neighbor to RAN Device 540, etc., is in use by a UE.

In an embodiment, HAC 542 and SDC 544 can be coupled to rule component 546. Rule component 546 can receive hierarchical data from HAC 542 and can receive state data from SDC 544. Rule component 546 can further receive input and/or supplemental data 570 from another device. In an embodiment, data 570 can comprise data that allows implementation of new rules, deletion of existing rules, modification of existing rules, etc., comprised in rule component 546. In some embodiments, data 570 can comprise information relation to historical RAN device use, events data, time, date, location, etc. In an embodiment, rule component 546 can enable determining state transition eligibility of RAN device 540, or of another RAN device. Moreover, rule component 546 can determine if a state transition in to be performed, initiated, etc., based on the RAN device being deemed eligible and satisfaction of rules related to use, time/date/place, historical data, etc. As an example, historical data indicating regular use of a RAN device during working hours can prevent a RAN device from going into a sleep mode during business hours even though it is otherwise eligible and unused. As a further example, historical data indicating irregular use of a RAN device during working hours can limit the RAN device to a 'snoozing' mode rather than a 'deep sleep' mode during business hours where it is eligible and unused, e.g., the RAN can stay active but broadcast an SSID less frequently that when at full power, which can save power and reduce interference but allow the RAN device to rapidly support an incoming UE.

RAN device 540 can comprise state adjustment component (SAC) 548. SAC 548 can initiate, implement, or perform a state transition based on information from rule component 546. In an aspect, rule component 546 can indicate which rules are satisfied and SAC 546 can, accordingly, determine what state transition(s) to implement. In an embodiment, SAC 548 can comprise snooze component 560, sleep component 562, off component 546, etc. Snooze component 560 can enable putting a RAN device, e.g., 540, etc., into a snooze mode that can be more power and interference friendly than a full power mode but less so than a sleep mode. Sleep component 562 can enable putting a RAN device, e.g., 540, etc., into a sleep mode that can be more power and interference friendly than either a full power mode or a snooze mode, but less so than an off mode. Off component 564 can enable putting a RAN device, e.g., 540, etc., into an off state that can be consume little to no power and cause little to no interference but can be much slower to transition out of in comparison to a sleep or snooze state. It will be appreciated that other states can be represent by components of SAC 548 and that all such other states are within the scope of the instant disclosure despite not being explicitly recited for the sake of clarity and brevity.

Figure 6:
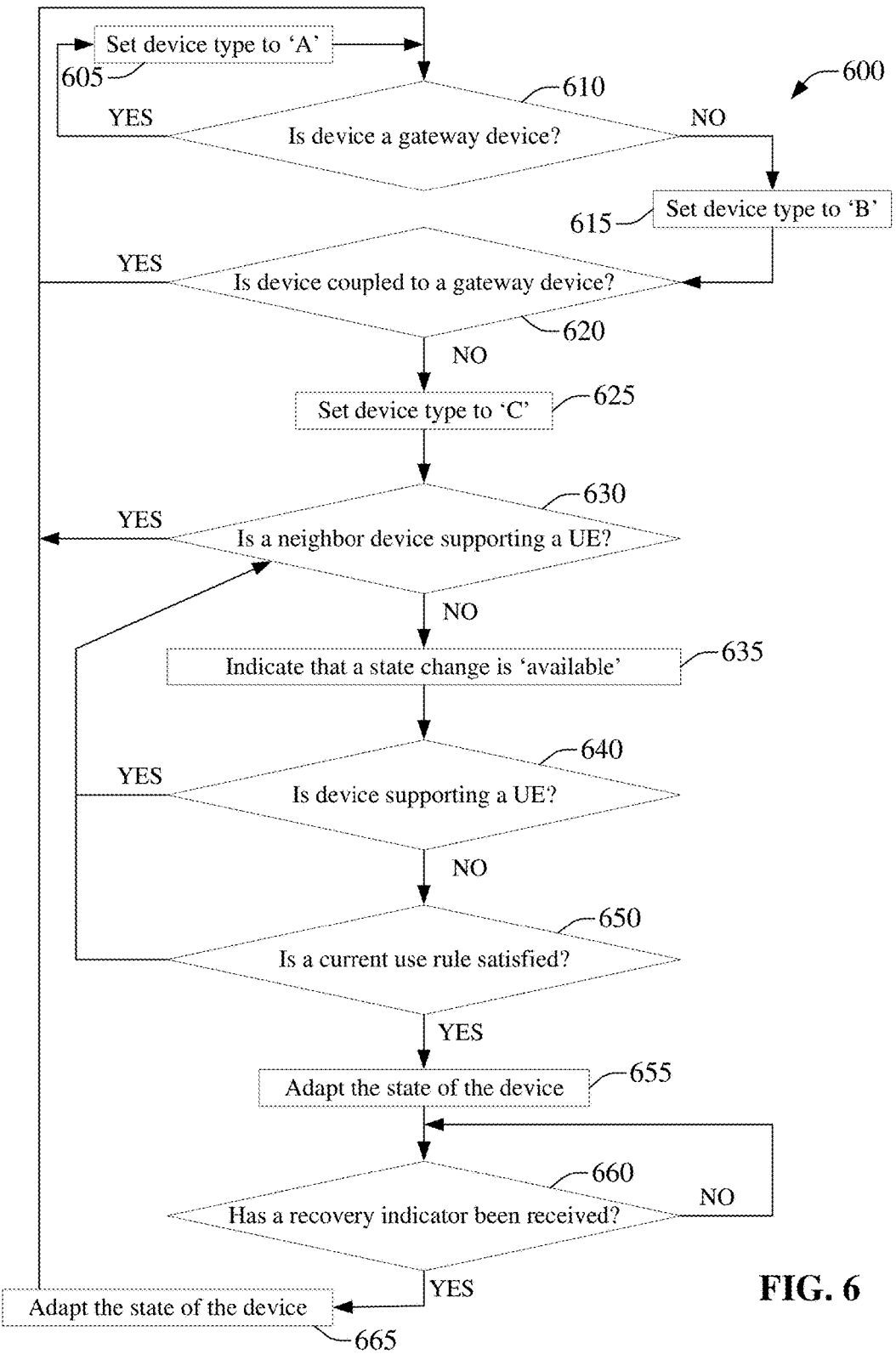
FIG. 6 illustrates a flowchart depicting adapting a state of a device based on a hierarchical class of the device, a state of a neighboring device, and a current state of the device, in accordance with aspects of the subject disclosure.
Figure 7:
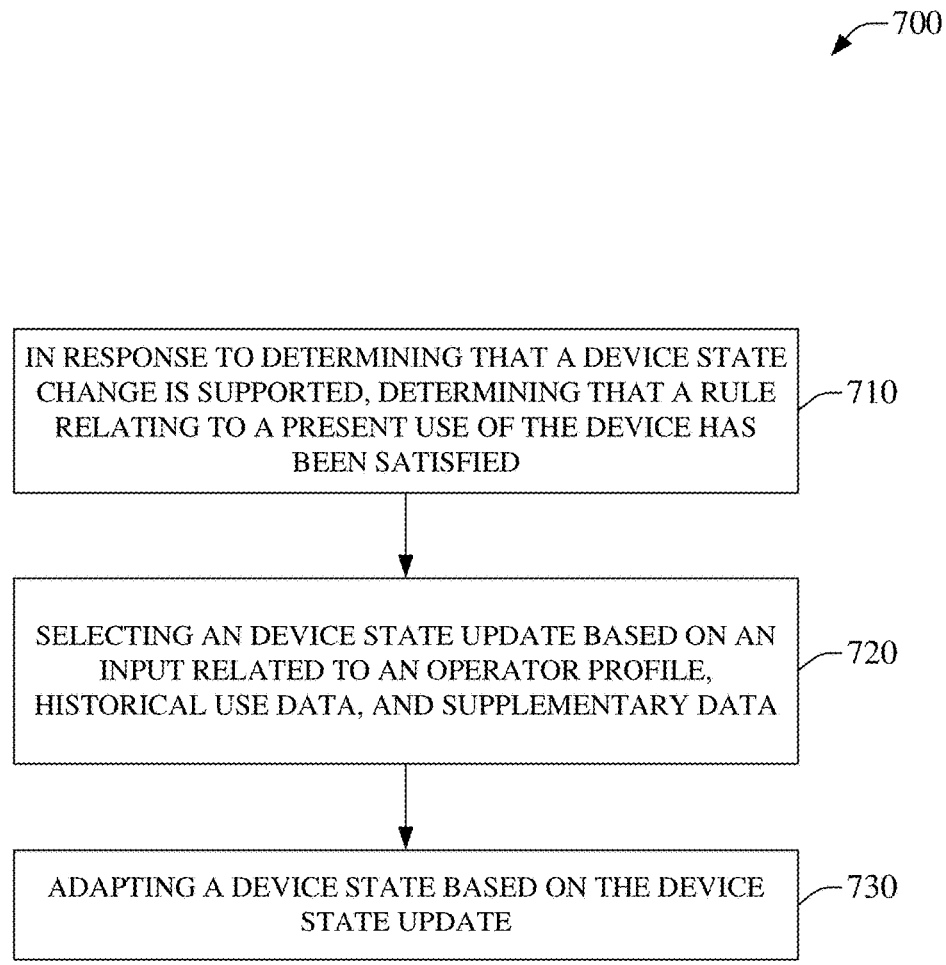
FIG. 7 illustrates an example method facilitating changing a device state based on a hierarchical class of the device, in accordance with aspects of the subject disclosure.
Figure 8:
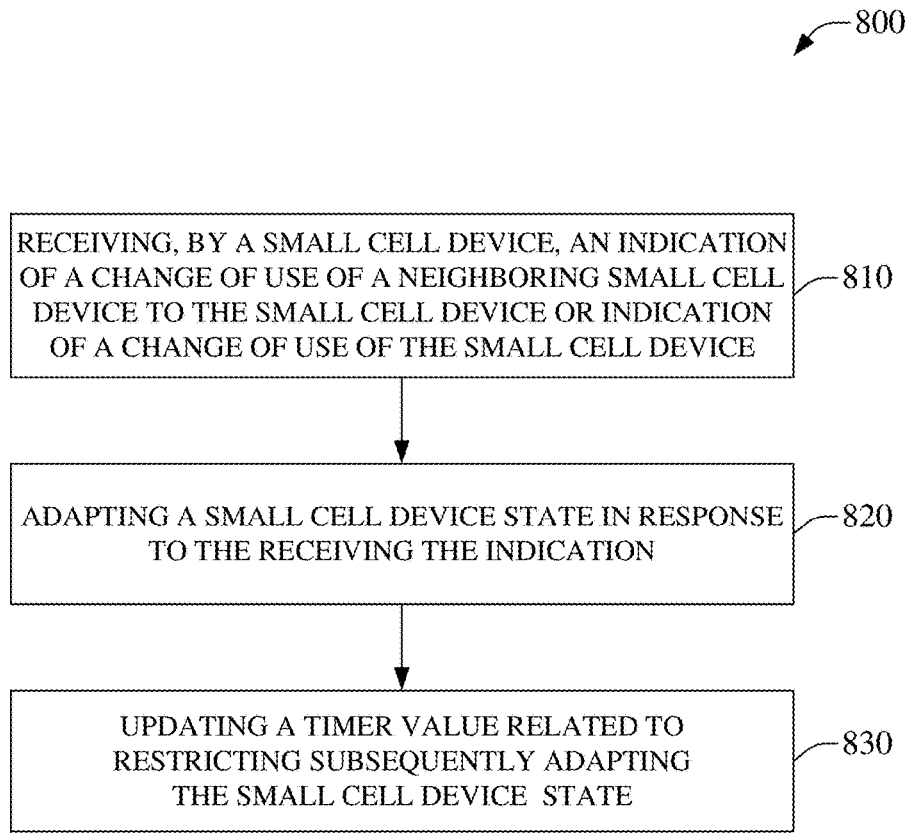
FIG. 8 illustrates an example method enabling time-delayed changing of a device state based on a hierarchical class of the device, in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 is an illustration of a flowchart 600, which can facilitate adapting a state of a device based on a hierarchical class of the device, a state of a neighboring device, and a current state of the device, in accordance with aspects of the subject disclosure. Flowchart 600 can comprise a controller determining if a RAN device is a gateway device at decision 610. A gateway RAN device can be designated as a RAN device that has a neighbor relation to a macro RAN device. Where the RAN device is determined to be a gateway device the RAN device can be set to type 'A' at 605. Where the RAN device is determined to not be a gateway device, e.g., the RAN device does not have a neighbor relation with a macro RAN device, then the device type can be set to type 'B' at 615.

At 620, flowchart 600 can comprise the controller determining if the RAN device is coupled to a gateway RAN device. Devices coupled to a gateway RAN device can be type 'B' devices or other RAN devices. Where the RAN device is determined to be coupled to a gateway RAN device the flow can return to decision block 610. Where the RAN device is determined by the controller to not be coupled to a gateway RAN device, the type can be set to type 'C' at 625. In an aspect, type A can be a gateway RAN device, type B can be an intermediate RAN device, and type C can be a field RAN device, as disclosed hereinabove.

At 630, it can be determined by the controller if another RAN device neighboring the RAN device is supporting a UE. In an aspect, supporting a UE can comprise a UE being camped on the neighboring RAN device. In another aspect, supporting a UE can comprise the UE having an active session with the neighboring RAN device, e.g., having a radio access bearer established via the neighboring RAN device. Where the neighboring RAN device is supporting a UE, the controller can return to 610. Where the neighboring RAN device is not supporting a UE, an indication that a state change is available can be made by the controller at 635.

At 640, it can be determined by the controller if the RAN device itself is supporting a UE. If the RAN device is itself supporting a UE, the controller can return to 630. This can allow the controller to continue to monitor for UE use of the RAN device itself or of a neighboring RAN device before determining to initiate a state transition. Where the RAN device itself is not supporting a UE, it can be determined by the controller, at 650, if a current use rule is satisfied. Satisfaction of the current use rule can be based on historical use data, supplementary data, e.g., time/date/location, an event occurrence, etc. Again, if the current use rule is not satisfied, the controller can return to 630 to allow the controller to continue to monitor relevant conditions of the RAN device prior to determining to initiate a state transition.

If the current use rule is satisfied at 650, the state of the RAN device can be adapted by the controller via a state transition at 655.

At 660, the controller can monitor for a recovery indicator related to the RAN device. Where a recovery indicator has been received, e.g., an indicator indicating that the RAN device should return to a full power state, that the RAN device should transition to another state, etc., then the controller can adapt the state of the device via a state transition at 665, then the controller can return to 610. Where a recovery indicator has not been received at the controller, then the controller can return to 660 to continue to monitor of a recovery indicator.

FIG. 7 illustrates example method 700 that facilitates changing a device state based on a hierarchical class of the device, in accordance with aspects of the subject disclosure. Method 700, at 710, can comprise, in response to determining that a device state change is supported, determining that a rule related to a present use of the device has been satisfied. The device state change can be determined to be supported based on the hierarchical class of the device. The hierarchical class can be related to a logical functionality of a device or to a type of a device. In an aspect, logical function of a device can be determined to act as a gateway device, an intermediate device, or a field device, even where the devices are otherwise the same or similar. In another aspect, different types of devices can be used for the different hierarchical classes, e.g., a first type of device can be used as a gateway device, a second type of device can be used for an intermediate device, and a third type of device can be used for a field device, wherein the first, second and third types of device can be different types.

In response to determining that the hierarchical class of device enables the device to undergo a state change, rules relating to a current use of the device can be employed to determine that the state change of the device should be initiated. In an aspect, the current use can relate to the device supporting a UE, e.g., an idle UE camped on the device, an active UE having a radio access bearer resource allocated via the device, etc. In some embodiments, current use can be based on UE use of neighboring devices, e.g., indicating a potential us of the current device due to the proximity of a supported UE.

At 720, method 700 can comprise selecting a device state update based on an input related to an operation profile, historical use data, and supplementary data. Once the device is determined to be eligible for a state transition and that the current use satisfies the related rules for imitating the state transition, the method at 720 can determine what that transition is based on inputs. An input can be an operator profile that comprises information relating to what state transition should be implemented for determined conditions. The conditions can be determined from supplemental data, e.g., time, date, place, nearby events, historical use data, etc.

At 730, the device state can be adapted, e.g., transitioned, based on the device state update determined at 720. At this point method 700 can end. The state transition determined at 720 can be applied at 730 in accord with the eligibility and satisfaction of the rules at 710. As such, for example, a field RAN device can be eligible, the field RAN device can be unused and a first layer of neighboring RAN devices can also be unused by a UE resulting in the determination that the field RAN device satisfies the use rules. It can then be determined, for example, that the field RAN device should enter a snooze state rather than an off or sleep state due to historical use data and the current time and day.

FIG. 8 illustrates example method 800 facilitating time-delayed changing of a device state based on a hierarchical class of the device, in accordance with aspects of the subject disclosure. Method 800, at 810, can comprise receiving, by a small cell device, e.g., a RAN device, etc., an indication of a change in use of a neighboring small cell device, wherein the neighboring small cell device is a neighbor of the small cell device, e.g., it can be indicated that a UE is now using a neighboring RAN device to a RAN device of interest. In the alternative, an indication of a change in the use of the small cell device itself can be received, e.g., a UE can be attempting to directly use the small cell device itself rather than being handed over from another device.

At 820, the small cell device state can be adapted in response to the receiving the indication at 810. As an example, where a first small cell device is in sleep mode, a controller device can receive an indication that a second small cell device, that is a neighbor to the first small cell device, has started to support a UE. The example controller can then adapt the state of the first small cell device, e.g., from the sleep state to another state, such as a wake state, full power state, etc. In the example, the first small cell device can be woken up in response to a UE moving closer to the first small cell device, wherein closer is indicative of a number of hops between the UE and the first small cell device. In an aspect, closer can also indicate that the UE is physically closer to the first small cell device because neighboring small cells can be closer together in distance as well as in number of hops between them. In some instances, a closer neighbor in hops will have a greater distance, but this can still be considered moving closer to the first small cell device due to the decrease in hops to the UE.

At 830, a timer value can be updated. At this point method 800 can end. The time value can be related to restricting subsequent adaptations of the small cell device state. This can reduce 'fluttering' where the RAN device cyclically transitions between states without remaining in any one state long enough to be meaningfully useful in the network of devices comprising the RAN device. As an example, where a small cell device is adapted to a full power state, the time can keep the device in full power state for a few seconds to a few hours, etc. Thus, where a neighboring small cell starts supporting a UE, the first small cell can be activated and remain on in accord with the timer. Thus, if the UE moves away and then comes closes again, such as where the user is walking out of their office to use the restroom and then comes back, the first small cell can be prevented from going to sleep during that short period where the UE was outside of the service area of the neighboring small cell. This can be similar to preventing your desktop computer from hibernating the second you stop using it which, if it occurred, could waste more time going in and out of hibernation that is acceptable, e.g., it can be cheaper to waste a short period of energy than to waste time waiting for state transitions to occur. The timer value can be adapted based on input associated with a user identity, e.g., the timer can be set by a systems administrator, an operator, can be adapted based on inference or machine learning techniques, can be based on historical use data, etc.

Figure 9:
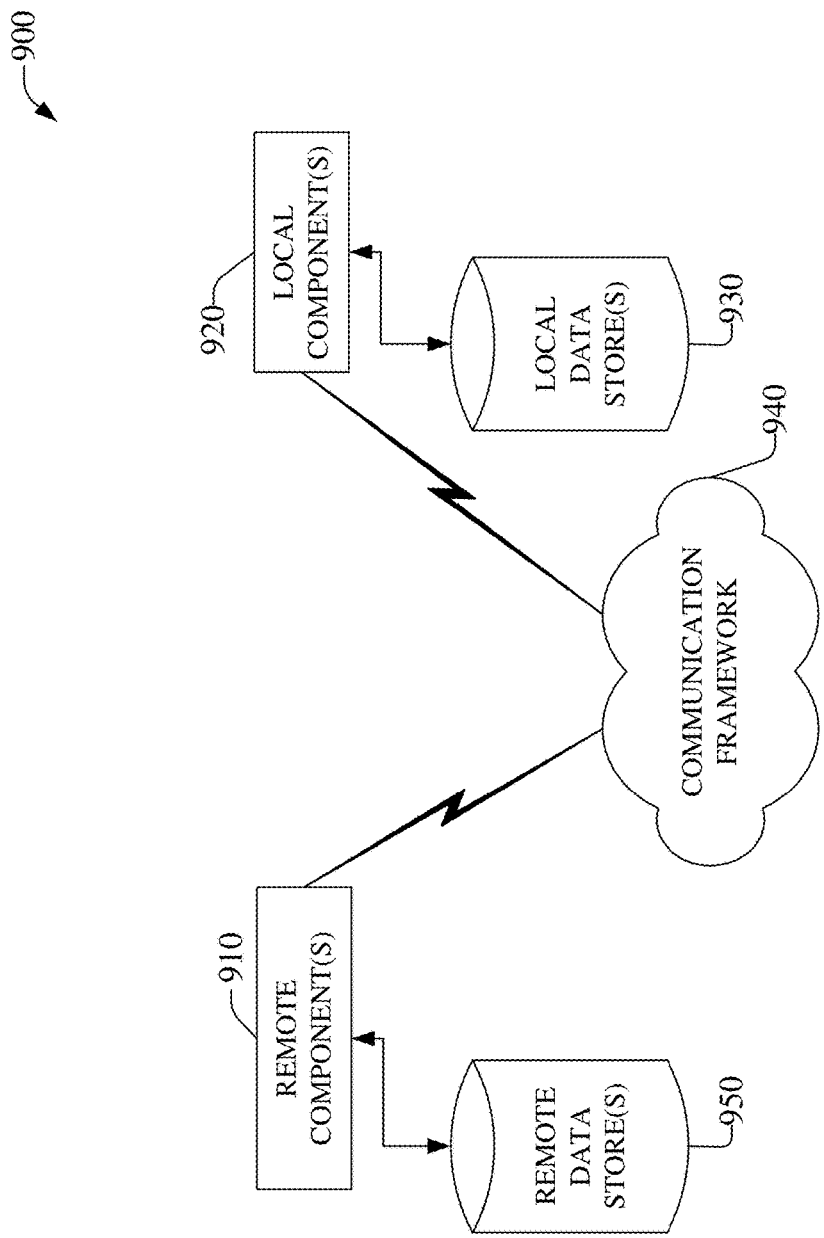
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be core network devices associated with a network provider identity, can be a macro RAN device, e.g., 102, 202, 302, 402, etc., UE 304, a device generating input(s) 570, etc.

The system 900 also comprises one or more local component(s) 920. The local component(s) 920 can be hardware and/or software (e.g., threads, processes, computing devices). In some embodiments, local component(s) 920 can comprise RAN devices, 110-130, 210-237, 310-338, 410-434, 540, etc., local controller devices, controller devices of RAN devices, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As examples, historical use data, supplementary data, current use data, neighboring use data, user input(s), etc., can be stored on remote data store(s) that can be comprised in or connected to a macro RAN device, e.g., 102, 202, 302, 402, etc., a UE 304, a device generating input(s) 570, etc.

Figure 10:
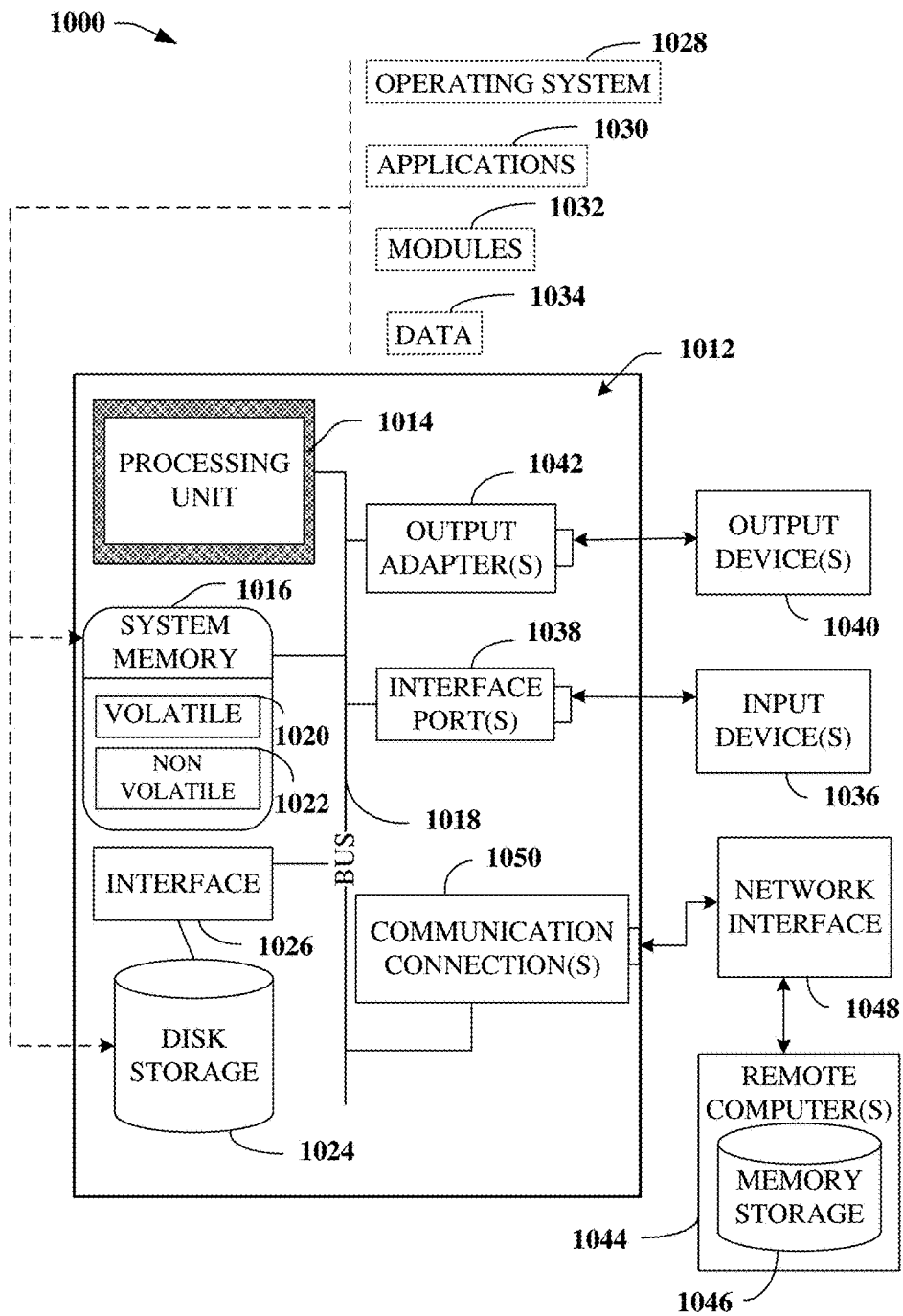
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, a macro RAN device, e.g., 102, 202, 302, 402, etc., a UE 304, a device generating input(s) 570, etc., a RAN device, 110-130, 210-237, 310-338, 410-434, 540, etc., a local controller device, a controller device of a RAN devices, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining, by a RAN device (110-130, 210-237, 310-338, 410-434, 540, etc.), a hierarchical class, a next state, satisfaction of a current use rule for the RAN device itself, or of a neighboring RAN device, and employing those determinations to effect a state transition for the RAN device.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial bus port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., an first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows. Data or signal information exchange can comprise technology, such as, single user (SU) multiple-input and multiple-output (MIMO) (SU MIMO) radio(s), multiple user (MU) MIMO (MU MIMO) radio(s), long-term evolution (LTE), LTE time-division duplexing (TDD), global system for mobile communications (GSM), GSM EDGE Radio Access Network (GERAN), Wi Fi, WLAN, WiMax, CDMA2000, LTE new radio-access technology (LTE-NX), massive MIMO systems, etc.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A field radio access network device, comprising:
a processor; and
a memory that stores executable instructions that, when executed by the processor, facilitate performance of operations, comprising:
enabling access to a parameter of the field radio access network device by a controller device; and
in response to receiving an indication from the controller device, changing a state of the field radio access network device, wherein the changing the state of the field radio access network device is based on a first field radio access network device relationship between the field radio access network device and a gateway radio access network device comprising a gateway neighbor relationship with a macro radio access network device, a second field radio access network device relationship between the field radio access network device and an intermediate radio access network device comprising an intermediate neighbor relationship with the gateway radio access network device, and a third field radio access network device relationship between the field radio access network device and a user equipment that is not affiliated with the field radio access network device and is not affiliated with a neighbor radio access network device that is a neighbor to the field radio access network device.

2. The field radio access network device of claim 1, wherein the changing the state of the field radio access network device results in altering a power state of the field radio access network device.

3. The field radio access network device of claim 1, wherein the changing the state of the field radio access network device results in the field radio access network device transmitting a different amount of radio frequency energy than before the initiating the state transition.

4. The field radio access network device of claim 1, wherein the controller device is comprised in the field radio access network device.

5. The field radio access network device of claim 1, wherein the controller device is comprised in a device other than the field radio access network device.

6. The field radio access network device of claim 5, wherein the field radio access network device is a first field radio access network device, and wherein the device other than the first field radio access network device controls a second field radio access network device.

7. The field radio access network device of claim 6, wherein the second field radio access network device comprises the controller device.

8. The field radio access network device of claim 6, wherein the second field radio access network device does not comprise the controller device.

9. A controller device, comprising:
a processor; and
a memory that stores executable instructions that, when executed by the processor, facilitate performance of operations, comprising:
accessing a parameter of a field radio access network device; and
causing the field radio access network device to undergo a state change, wherein the state change is based on a first field radio access network device relationship between the field radio access network device and a gateway radio access network device comprising a gateway neighbor relationship with a macro radio access network device, a second field radio access network device relationship between the field radio access network device and an intermediate radio access network device comprising an intermediate neighbor relationship with the gateway radio access network device, and a third field radio access network device relationship between the field radio access network device and a user equipment that is not affiliated with the field radio access network device and is not affiliated with a neighbor radio access network device that is a neighbor to the field radio access network device.

10. The controller device of claim 9, wherein the state change results in altering power consumed by the field radio access network device.

11. The controller device of claim 9, wherein the state change results in transmitting a different amount of radio frequency energy via the field radio access network device than before the state change.

12. The controller device of claim 9, wherein the controller device is comprised in a gateway radio access network device.

13. The controller device of claim 9, wherein the controller device is comprised in a macro radio access network device.

14. The controller device of claim 9, wherein the field radio access network device is a first field radio access network device, and wherein the controller device is comprised in a second field radio access network device.

15. The controller device of claim 9, wherein the field radio access network device is a first field radio access network device, and wherein the controller device further controls a second field radio access network device.

16. A method, comprising:
in response to receiving, by a system comprising a processor, a parameter of a field radio access network device, determining a first field radio access network device relationship between the field radio access network device and a gateway radio access network device comprising a gateway neighbor relationship with a macro radio access network device, a second field radio access network device relationship between the field radio access network device and an intermediate radio access network device comprising an intermediate neighbor relationship with the gateway radio access network device, and a third field radio access network device relationship between the field radio access network device and a user equipment that is not affiliated with the field radio access network device and is not affiliated with a neighbor radio access network device that is a neighbor to the field radio access network device; and
triggering, by the system, a state change of the field radio access network device based on the first field radio access network device relationship, the second field radio access network device relationship, and the third field radio access network device relationship.

17. The method of claim 16, wherein the state change causes the field radio access network device to consume a different amount of power than before the state change.

18. The method of claim 16, wherein the state change causes the field radio access network device to generate a different amount of radio frequency energy than before the state change.

19. The method of claim 16, wherein the system comprising the processor is comprised in a gateway radio access network device.

20. The method of claim 16, wherein the system comprising the processor is comprised in a device located remotely from the field radio access network device.

* * * * *